N. S. Clement,
Fruit Basket.
Nº 82,601. Patented Sep. 29, 1868.
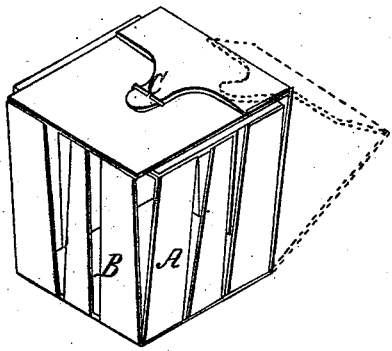
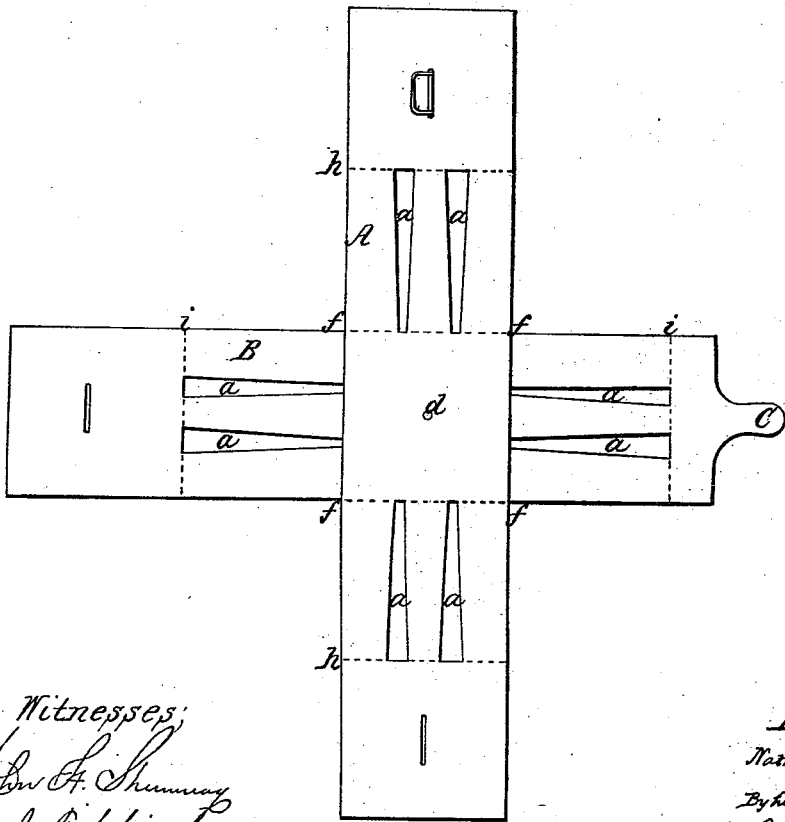
Witnesses:
Inventor:
Nathan S. Clement
By his Attorney
John E. Earl

United States Patent Office.

NATHAN S. CLEMENT, OF NEW BRITAIN, CONNECTICUT.

Letters Patent No. 82,601, dated September 29, 1868.

IMPROVED FRUIT-BASKET.

The Schedule referred to in these Letters Patent and making part of the same.

TO ALL WHOM IT MAY CONCERN:

Be it known that I, NATHAN S. CLEMENT, of New Britain, in the county of Hartford, and State of Connecticut, have invented a new Improvement in Fruit-Baskets; and I do hereby declare the following, when taken in connection with the accompanying drawings, and the letters of reference marked thereon, to be a full, clear, and exact description of the same, and which said drawings constitute part of this specification, and represent, in—

Figure 1, a perspective view of the basket, complete; and, in

Figure 2, a diagram, illustrating the manner of construction.

This invention relates to an improvement in baskets or boxes for packing fruit for transportation, the object being to produce a box which may be closed upon all sides; and the invention consists in forming the whole from veneers or laminæ of wood, laid across each other at right angles, thus forming a double bottom, and one of the pieces turned up to form the two opposite sides, and over, so as to meet across the top, and there secured together; the other part or piece, so as to form the other two sides, and turned again across the top, so as to be there secured, one of the sides being left so as to open as a cover.

To enable others to construct my improvement, I will fully describe the same, as illustrated in the accompanying drawings.

A is the one piece or lamina, of wood, B the other, cut to the proper size, and, with perforations, $a$, of any desirable form, for ventilation, are laid across each other, as in fig. 2, and are secured together at $d$, by a rivet or otherwise. Then the two ends of the piece A are turned up, bending at the angle $f$, so as to form the sides, as denoted in fig. 1. Then, at the top of the box, at the line $h$, the two ends are turned down, and secured together in any convenient manner. Then the ends of the part B are in like manner turned up, and, at the line $i$, turned across the top, one of the ends of the piece B being secured upon the top to the ends of the part A, while the other end of the part B is left free, so as to open the box, as denoted in red, fig. 1. At the same time, a convenient means of securing the loose end of the part B (when the box is closed) is necessary, and this I prefer to do by forming a tongue, C, on the end, and a loop upon the top of the box, into which to tuck the tongue, as seen in fig. 1. Other means of securing that end may be employed.

I prefer to make this box flaring, as in fig. 1, so as to leave an opening at the angle.

I do not wish to be understood as claiming the construction of a fruit-basket from two veneers or laminæ of wood, laid across each other, so as to form a double bottom, and so that each of the pieces form corresponding sides of the box, as such, I am aware, is not new.

I am aware of the patent of J. W. Hayes, August 12, 1856, and the reissue of the same, and I do not wish to be understood as claiming any part of the invention of the said Hayes; but What I do claim as new and useful, and desire to secure by Letters Patent, is—

Extending the two parts which form the double bottom and sides, so as to be turned over, and form a top for the box, and so that one of the parts is detachable, the whole constructed and arranged for opening, substantially in the manner herein set forth.

NATHAN S. CLEMENT.

Witnesses:
C. E. MITCHELL,
V. B. CHAMBERLAIN.